US008443300B2

(12) United States Patent
Nankani

(10) Patent No.: US 8,443,300 B2
(45) Date of Patent: May 14, 2013

(54) THREE DIMENSIONAL NAVIGATION OF LISTING INFORMATION

(75) Inventor: Satish Kumar Nankani, Andhra Pradesh (IN)

(73) Assignee: eBay Inc., San Jose, CA (US)

( * ) Notice: Subject to any disclaimer, the term of this patent is extended or adjusted under 35 U.S.C. 154(b) by 297 days.

(21) Appl. No.: 12/862,630

(22) Filed: Aug. 24, 2010

(65) Prior Publication Data

US 2012/0054622 A1    Mar. 1, 2012

(51) Int. Cl.
*G06F 15/00* (2006.01)
*G06F 13/00* (2006.01)

(52) U.S. Cl.
USPC .......................................... 715/836; 715/848

(58) Field of Classification Search .................. 715/836, 715/753, 739, 727, 763–765
See application file for complete search history.

(56) References Cited

U.S. PATENT DOCUMENTS

| 7,685,619 B1* | 3/2010 | Herz ............................... 725/52 |
| 8,001,476 B2* | 8/2011 | Gallo ............................ 715/742 |
| 2009/0187862 A1* | 7/2009 | DaCosta ....................... 715/836 |
| 2010/0077434 A1* | 3/2010 | Kikinis .......................... 725/44 |
| 2010/0093400 A1* | 4/2010 | Ju et al. ......................... 455/566 |

* cited by examiner

*Primary Examiner* — Cao Kevin Nguyen
(74) *Attorney, Agent, or Firm* — Schwegman, Lundberg & Woessner, P.A.

(57) ABSTRACT

Computerized methods and systems for three-dimensional (3-D) displaying and navigating of search results are provided. In embodiments, a criterion may be received from a user of a publication system. A database associated with the publication system may be searched based on the criterion. Search results retrieved from the database may be displayed on at least one side of a 3-D interface object. At least one control may be displayed proximate to the three 3-D interface object. The control may be used to navigate the 3-D interface object.

35 Claims, 13 Drawing Sheets

THREE DIMENSIONAL NAVIGATION OF LISTING INFORMATION

TECHNICAL FIELD

Example embodiments relate generally to the technical field of data communication and presentation.

BACKGROUND

More and more, users of the Internet are realizing the ease and convenience of searching online for information on a variety of subjects. For example, users may search for information related to one or more items or services of interest, destination locations, driving directions, books in a library, or financial information such as mortgage interest rates and prices of securities in a financial market.

On the other hand, content providers such as corporate web designers or hobbyists may struggle to make their contents accessible to searching users. Content providers may compete by increasing ranking in search results generated by search engines, such as GOOGLE, YAHOO, ALTA VISTA, and the like.

BRIEF DESCRIPTION OF THE DRAWINGS

Some embodiments are illustrated by way of example and not limitation in the figures of the accompanying drawings in which.

DETAILED DESCRIPTION

Example methods and systems for 3-D displaying and navigating of search results are described. In the following description, for purposes of explanation, numerous specific details are set forth to provide a thorough understanding of example embodiments. It will be evident, however, to one of ordinary skill in the art that the present invention may be practiced without these specific details and/or with different combinations of the details than are given here. Thus, specific embodiments are given for the purpose of simplified explanation and not limitation.

Some embodiments described herein may include a computerized method comprising receiving a criterion from a user of a publication system. A database associated with the publication system may be searched based on the criterion. Search results retrieved from the database may be displayed on at least one side of a 3-D interface object. At least one control may be displayed proximate to the 3-D interface object. The control may be used to navigate the 3-D interface object.

Figure 1:
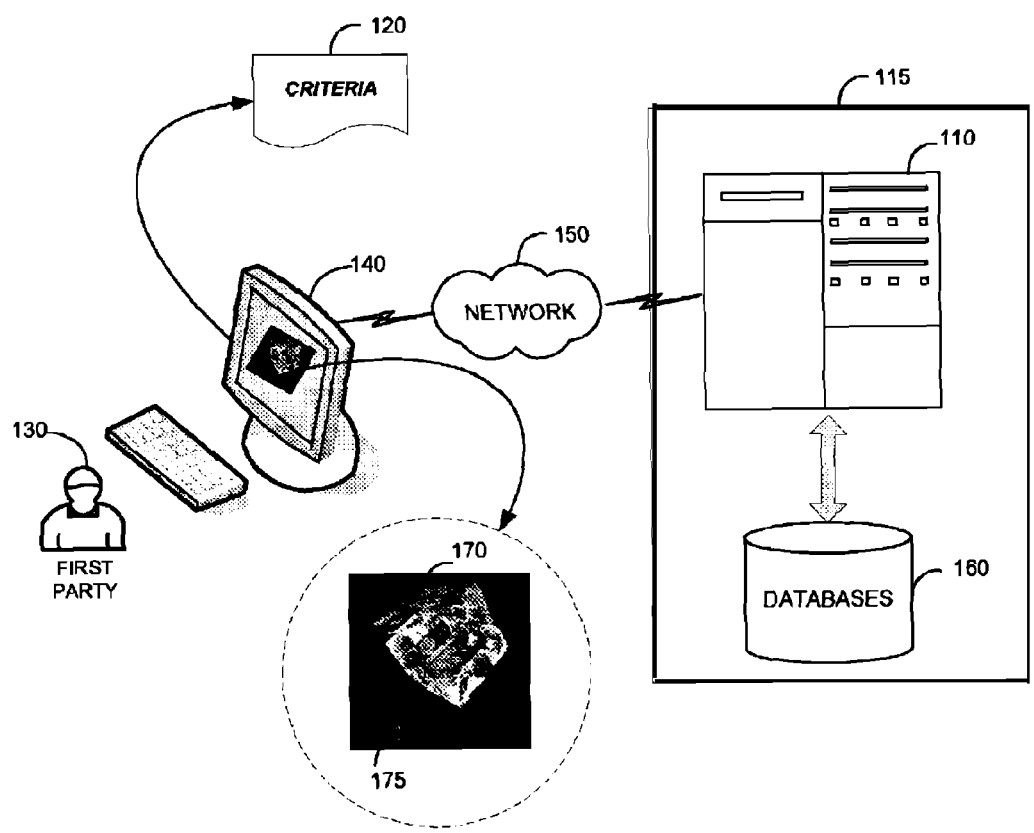
FIG. 1 is a diagram illustrating functionality of a system for three-dimensional (3-D) displaying and navigation of search results, according to various embodiments.

FIG. 1 is a diagram illustrating functionality of a system for 3-D display and navigation of search results, according to various embodiments. The system may comprise a server 110 of a publication system 115, including a network-based commerce system such as EBAY INC. of San Jose Calif., the assignee of the present disclosure. The server 110 may be coupled, via a network 150 (e.g., the Internet) to a client machine 140. In some embodiments, the client machine 140 may comprise a personal computer (PC) such as a desktop or a laptop, a Personal Digital Assistant (PDA), a cell phone, or the like.

A user 130 of the client machine 140 may search the publication system 115 for publication information in the example form of a listing, such as an online item or an online service. The items may include goods (e.g., cars, consumer electronics, appliances, etc.) and online publications (e.g., books, journals, newspapers, weblogs, etc.). The online services may comprise travel services, car rentals, hotel reservations, equipment rentals, real estate services and so forth. The server 110 may receive one or more criteria 120 (e.g., a query including a keyword) from the user 130. The server 110 may search the database 160 to retrieve a number of listings that match the criteria 120. The database 160 may comprise a single database and/or multiple databases stored on a single or multiple storage devices.

The server 110 may display search results (e.g., listings in the publication system 115 relating to the criteria 120) retrieved from the database 160 on one or more sides of a 3-D interface object 170. In other systems, the listings are shown in consecutive horizontal rows with a limited number of listings per page. Many users may browse the first few listings and not bother to go through several pages to see the whole set of listings. Example embodiments allow the user 130 to see thumbnail previews of numerous listings by navigating to different sides of a 3-D interface object shown on a single page.

Figure 11:
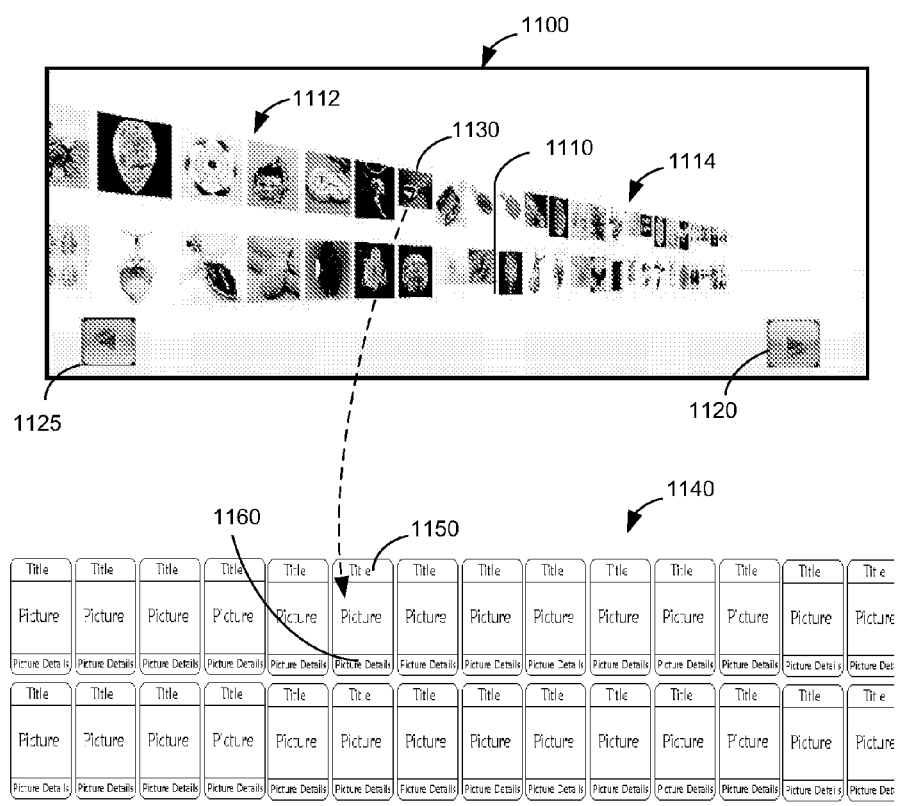
FIG. 11 is a screen shot illustrating a 3-D wall display of listing items, according to various embodiments.
Figure 12:
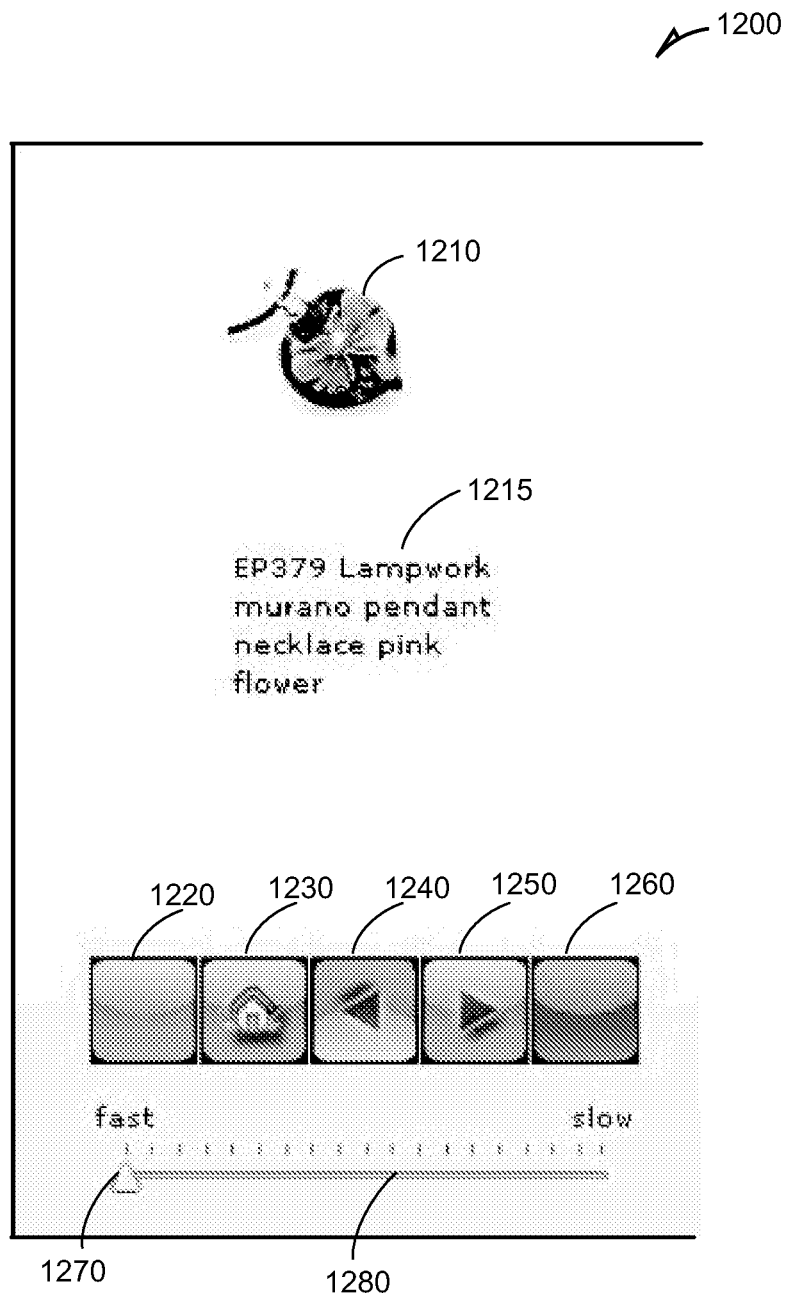
FIG. 12 is a screen shot illustrating a slide show of the listing items shown in the 3-D wall of FIG. 12, according to various embodiments.

In some embodiments, the 3-D interface object may comprise, but is not limited to, a 3-D shape such as a cube (shown in FIGS. 10 and 11), a sphere, an ellipsoid, or a 3-D wall as shown in FIG. 12. The one or more sides, when referring to a sphere or an ellipsoid, may be defined with reference to a viewer. For example, the sphere or the ellipsoid may have a viewable side (e.g., a front side) or a side that is not viewable by the viewer (e.g., a back side). Multiple results (e.g., text, image, etc. relating to the listings) may be shown on each side of the 3-D interface object. For example, the displayed results shown on each side of the 3-D interface object may be arranged in multiple rows and columns. The server 110 may also display, proximate to the three 3-D interface object 170, one or more controls 175 to be used to navigate the 3-D interface object 170. The server 110 may perform the above functionalities by using the components and modules described below with respect to FIG. 2.

Figure 2:
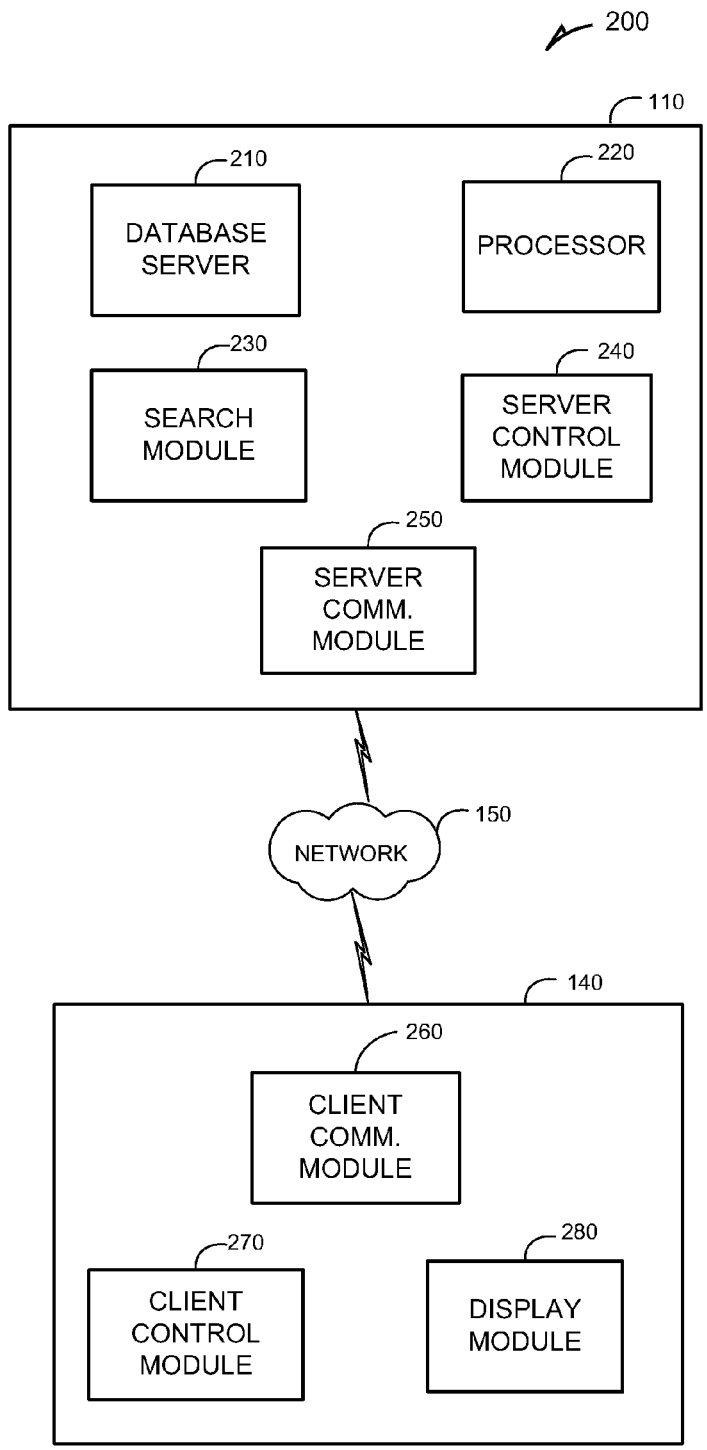
FIG. 2 is a block diagram illustrating a system for 3-D displaying and navigation of search results, according to various embodiments.

FIG. 2 is a block diagram illustrating a system 200 for 3-D display and navigation of search results, according to various embodiments. The system 200 comprises the server 110 linked to the client machine 140 via the network 150. The server 110 may comprise a database server 210, a processor 220, a search module 230, a server communication module 250, and a server control module 240. In embodiments, the server communication module 250 may comprise hardware and/or software (e.g., be e processor-implemented mobile) and may operate as a network interface device 790 shown in FIG. 7. The search module 230 and the server control module 240 may similarly comprise hardware and/or software. The software may be implemented by the processor 220 or a processor 760 shown in FIG. 7.

The server communication module 250 may receive a query from the user 130 of FIG. 1. The query may comprise one or more words (e.g., keywords) related to an electronic publication (e.g., a listing for an online item or service) in the publication system 115 of FIG. 1. The search module 230 may operate to use the database server 210 to search the database 160 of FIG. 1 by using the one or more keywords and retrieving search results (e.g., listings) from the database 160. The processor 220 may cause the display module 280 to display search results retrieved from the database 160. The search results may be displayed on one or more sides of a 3-D interface object. In embodiments, the display module 280 may cause a a display unit 710 shown in FIG. 700 to display the listings.

A form of the 3-D interface object, such a cube, sphere, ellipsoid or 3-D wall may be selected by the user 130. The display module 280 may display the listings as thumbnails on different sides of, for example, the cube, sphere, ellipsoid, or 3-D wall as shown in FIGS. 9-13. The user 130 may select a thumbnail by, for instance, clicking on the selected thumbnail to see a detailed description of the listing displayed on the selected thumbnail. In embodiments, the detailed description may be shown on a separate page or on the same page with the 3-D interface object. The user 130 may also be able to navigate the 3-D interface object using one or more controls 175 of FIG. 1.

The display module 280 may display the one or more controls 175 proximate (e.g., adjacent) to the 3-D interface object. In embodiments, for example, when the 3-D interface object comprises a 3-D wall, the controls 175 may be displayed over the 3-D interface object. In an embodiment, the 3-D wall may comprise a slide show that the user 130 can operate by using the one or more controls 175.

The server control module 240 may receive signals from the one or more controls 175. For example, in the case of the 3-D wall, the signals may indicate a selection by the user 130 of an operation including playing, pausing, forwarding, or rewinding of the slide show. In embodiments, the server control module 240 may operate to receive the signals from an input device such as a keyboard, joystick, or a mouse. The server control module 240 may then operate to send commands to client control module 270 to request from the display module 280 performance of the operation selected by the user 130. In response to the request, the display module 280 may perform the selected operation.

The signals received by the server control module 240 may indicate a selection by the user 130 to rotate the 3-D interface object. The signals may also indicate an axis of rotation (e.g., X, Y, and Z) and/or a direction of rotation (e.g., clockwise, counter-clockwise, etc.) selected by the user 130. After receiving the signal, the server control module 240 may operate to send one or more commands to the client control module 270 requesting that the 3-D interface object be rotated around the selected axis of rotation and in the selected direction. The client control module 270 may render a rotation of the 3-D interface object around the axis of rotation and in the direction selected by the user 130 and request the display module 280 to display the rotation. The display module 280 may, in response, rotate the 3-D interface object around the selected axis of rotation and in the selected direction.

The client machine 140 linked to the server 110 via the network 150 may comprise a client communication module 260, a display module 280, and a client control module 270. The client communication module 260 and the display module 280 may comprise hardware. The client control module 270 may comprise hardware and/or software. The software may be implemented by a processor such as the processor 760 of FIG. 7.

The client communication module 260 may transmit one or more criteria 120 of FIG. 1 (e.g., one or more queries including one or more keywords) received from the user 130 of FIG. 1 to the server 110. The server 110 may search the database 160 of FIG. 1 to retrieve listings in the publication system 115 of FIG. 1 that match the criteria 120. The server may then send the search results (e.g., listings) to the client machine 140. The client communication module 260 may receive the search results from the server 110. The client communication module 260 may also receive one or more commands relating to the listings from the server 110.

The commands may correspond to user selections received by the server control module 240 of FIG. 2. For example, the commands may correspond to a selection of the form of the 3-D interface object (e.g., cube, sphere, ellipsoid, or 3-D wall). The commands may also correspond to a selection of an axis of rotation and/or a direction of rotation of the 3-D interface object, and/or operations such as playing, forwarding, rewinding, or pausing of a slide show. The client control module 270 may receive the commands from the client communication module 260.

In response, the client control module 270 may control a rotation of the 3-D interface object around the axis of rotation and in the direction selected by the user 130. The user selection may be received from the server 110, one or more controls 175 of FIG. 1, and/or an input device such as a keyboard, mouse, joystick, or the like. The display module 280 may display the rotation of the 3-D interface object. The display module 280 may also display the one or more controls 175 of FIG. 1, adjacent to the 3-D interface object, or, in embodiments such as the 3-D wall, on a portion of the 3-D wall.

Figure 3:
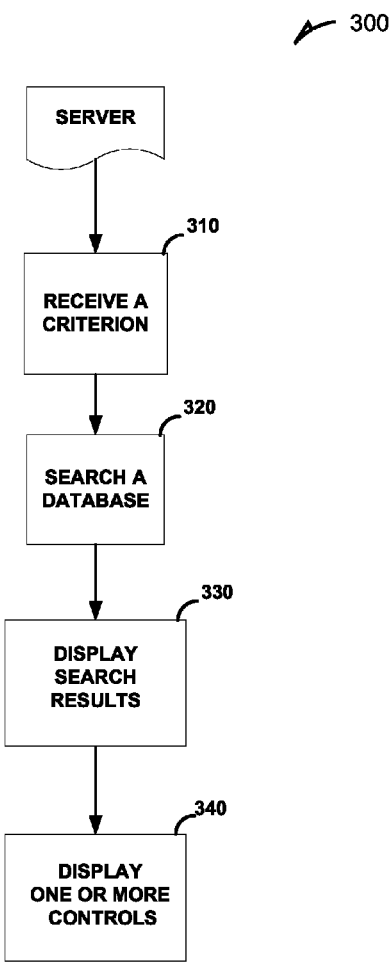
FIG. 3 is a flow diagram illustrating a method of 3-D displaying and navigating of search results, according to various embodiments.

FIG. 3 is a flow diagram illustrating a method 300 of 3-D displaying and navigating of search results, according to various embodiments. The method 300 may be executed by the server 110 of FIG. 2. The method 300 starts at operation 310, where the server 110 of the publication system 115 receives criteria 120 from the user 130 of FIG. 1. The criteria 120 may comprise a query including keywords relating to one or more listings in the publication system 115.

At operation 320, the server 110 may use the criteria 120 to search the database 160 for listings that match the criteria 120. The search results may include multiple listings such as online items or services. The online items may include goods (e.g., cars, consumer electronics, appliances, etc.), online publications (e.g., books, journals, news papers, weblogs, etc.), online services, and the like. The online services may comprise travel services, car rentals, hotel reservations, equipment rentals, real estate services and the like.

At operation 330, the processor 220 may cause the display module 280 of FIG. 2 to display the listings retrieved from the database 160 on one or more sides of a 3-D interface object. The form of the 3-D interface object may be selected by the user 130 of FIG. 1, and may comprise, inter alia, a cube, a sphere, an ellipsoid, or a 3-D wall. The 3-D wall may comprise a slide show. The listings may be displayed as thumbnails on various sides of the 3-D interface object. The user 130 may select a listing by clicking on a selected thumbnail corresponding to the selected listing. A detailed description of the selected listing may be shown on a separate page or on the same page where the 3-D interface object is displayed.

At operation 340, the processor 220 may cause the display module 280 to display the controls 175 of FIG. 1 adjacent or over the 3-D interface object. The controls 175 may be shown on the 3-D interface object, for example, when the selected 3-D interface object comprises a 3-D wall. The controls may be used by the user 130 to navigate the 3-D interface object. For instance, the user 130 may use the controls 175 to view rotation of the cube, sphere or ellipsoid around a selected axis of rotation and in a selected direction of rotation. The user 130 may also use the controls 175 shown on or adjacent to a slide show to control the slide show (for example, to play, pause, forward, or rewind the slide show).

Figure 4:
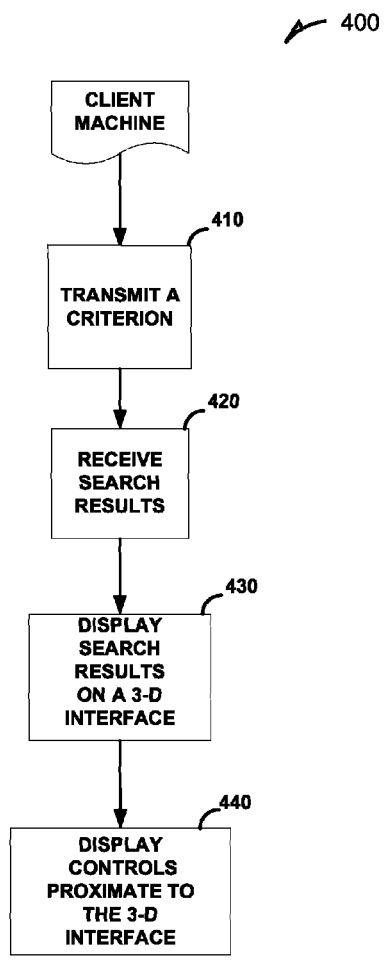
FIG. 4 is a flow diagram illustrating a method of 3-D displaying and navigating of search results, according to various embodiments.

FIG. 4 is a flow diagram illustrating a method 400 of 3-D displaying and navigating of search results, according to various embodiments. The method 400 will be implemented by the client machine 140 of FIG. 2. The method 400 may start at operation 410, where the client communication module 260 of FIG. 2 may transmit the criteria 120 of FIG. 1 from the client machine 140 to the server 110 of FIG. 3. The server 110 may search the database 160 based on the criteria 120 and send the search results, such as a number of listings, to the client machine 140.

At operation 420, the client communication module 260 of FIG. 2 may receive the listings from the server 110. The client communication module 260 may also receive a number of command signals from the server 110. The command signals may correspond to displays of the listings by the display module 280 of FIG. 2.

At operation 430, the display module 280 may display the listings on one or more sides of a 3-D interface object. The form of the 3-D interface object may be selected by the user 130 of FIG. 1. The display module 280 may use the command signals to navigate the 3-D interface object.

At operation 440, the display module 280 may display a number of controls 175 of FIG. 1 adjacent to or over the 3-D interface object. For example, when the 3-D interface object comprises a 3-D wall, the controls 175 may be shown over a portion of the 3-D wall. The controls 175 may be used by the user 130 to navigate the 3-D interface object.

Figure 5:
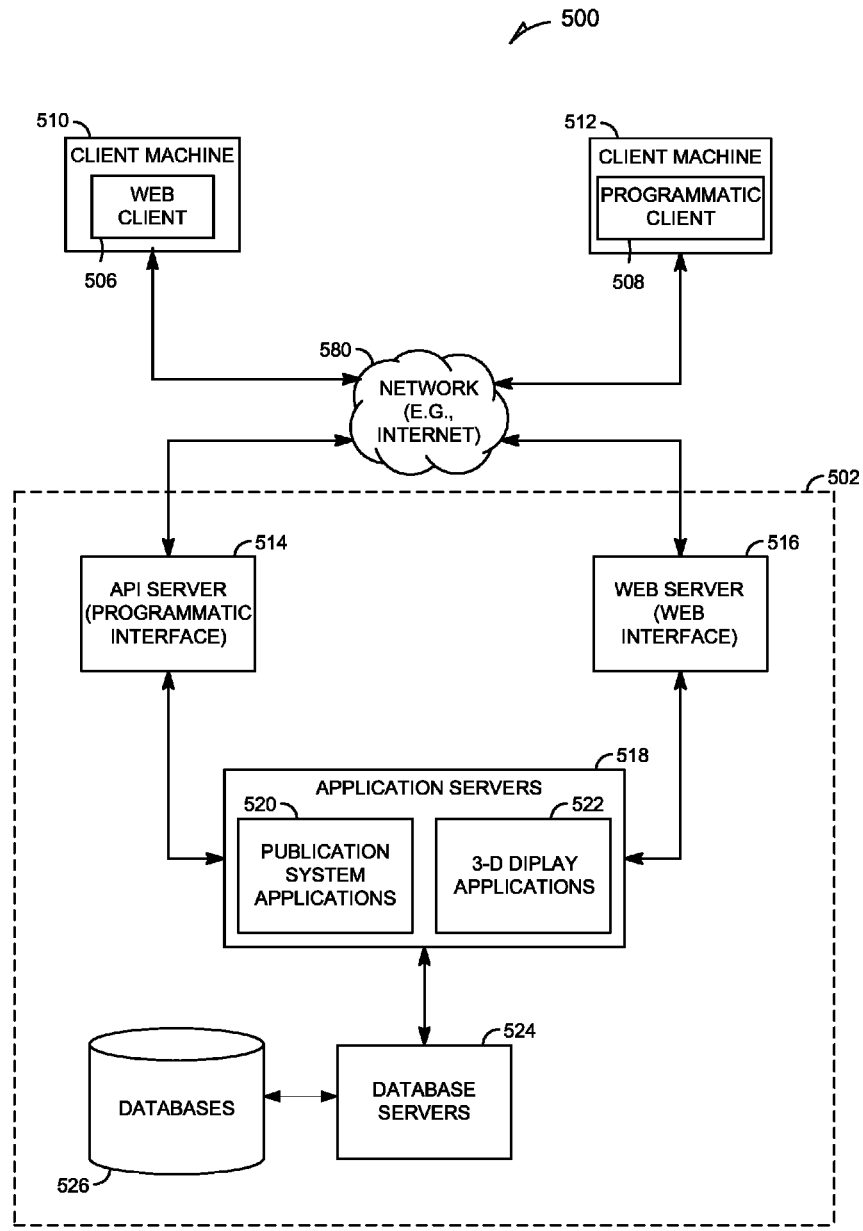
FIG. 5 is block diagram illustrating a network-based publication system, according to various embodiments.

FIG. 5 is high-level block diagram illustrating an example network-based publication system 500, having a client-server architecture for facilitating 3-D display and navigation of listings. The network-based publication system 500, in the example form of a network-based 3-D display and navigation server 502, provides server-side functionality, via a network 580 (e.g., the Internet) to one or more clients. FIG. 5 illustrates, for example, a Web client 506 (e.g., a browser, such as the INTERNET EXPLORER browser developed by MICROSOFT CORPORATION of Redmond, Wash.), and a programmatic client 508 executing on respective client machines 510 and 512.

Turning to the 3-D display and navigation server 502, an Application Program Interface (API) server 514 and a Web server 516 are coupled to, and provide programmatic and Web interfaces respectively to, one or more application servers 518. The application servers 518 host one or more publication system applications 520 and 3-D display applications 522. The application servers 518 are, in turn, shown to be coupled to one or more database servers 524 that facilitate access to one or more databases 526.

The publication system applications 520 provide a number of payment functions and services to users who access the network-based 3-D display and navigation server 502. The 3-D display applications 522 facilitate real-time contextual spending in person-to-person payment activities over the network 580.

Further, while the network-based publication system 500 shown in FIG. 5 employs a client-server architecture, the present application is, of course, not limited to such an architecture and could equally well find application in a distributed, or peer-to-peer, architecture system. The various publication system and 3-D display applications 520 and 522 may also be implemented as standalone software programs, which do not necessarily have networking capabilities.

It should be appreciated that the Web client 506 may access the various publication system and 3-D display applications 520 and 522 via the Web interface supported by the Web server 516. Similarly, the programmatic client 508 accesses the various services and functions provided by the publication system and 3-D display applications 520 and 522 via the programmatic interface provided by the API server 514. The programmatic client 508 may, for example, include registration applications to provide interested users (e.g., users of the network-based payment system) with registration forms to sign up for advertising items or services on the network-based publication system 500.

The programmatic client 508 may also include communication applications to perform batch-mode communications between the programmatic client 508 and the network-based 3-D display and navigation server 502.

Figure 6:
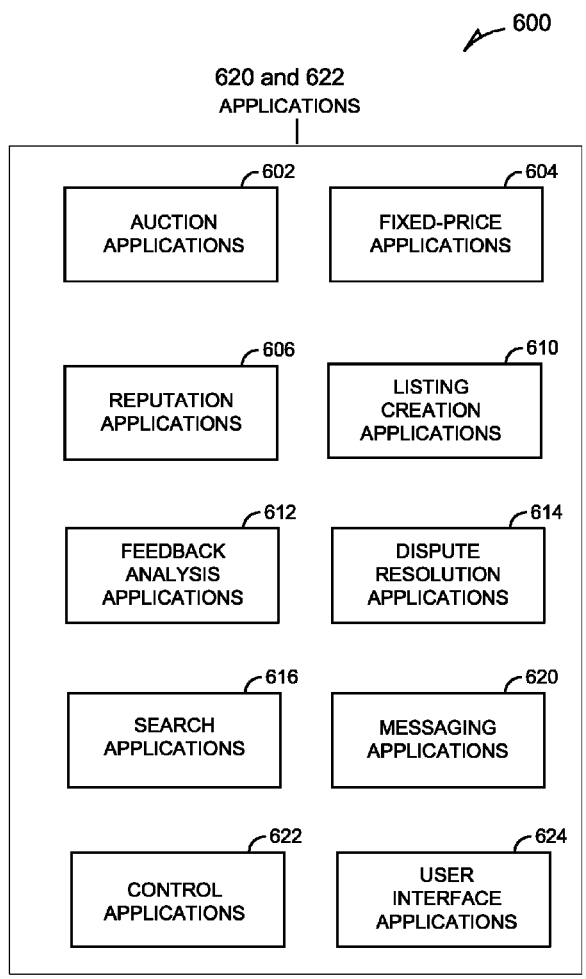
FIG. 6 shows a set of applications used by the network-based publication system of FIG. 6, according to various embodiments.

FIG. 6 shows an example set of applications 600 included in the applications 520 and 522 served by the application server 518 used by the network-based publication system 500 of FIG. 5. The network-based publication system 500 may provide 3-D displaying and navigation of search results, including listing information retrieved from the network-based publication system 500. The applications 600 are shown to include one or more auction applications 602, which support auction-format listing and price setting mechanisms (e.g., English, Dutch, Vickrey, Chinese, Double, Reverse auctions, etc.). The various auction applications 602 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 604 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and may allow a buyer to purchase goods or services, which are also being offered for sale via an auction, for a fixed-price that is typically higher than the starting price of the auction.

Reputation applications 606 may allow parties that transact utilizing the network-based publication system 500 to establish, build, and maintain reputations related to market participants (e.g., sellers, buyers, service providers, or clients) which may be published and made available to potential trading partners. Consider that where, for example, the network-based publication system 500 supports person-to-person trading, users may have no history or other reference information whereby the trustworthiness and credibility of potential trading partners may be assessed. The reputation applications 606 may allow a user, for example through feedback provided by other transaction partners, to establish a reputation over time within the network-based publication system 500. Other potential trading partners may then reference such a reputation for the purposes of assessing credibility and trustworthiness.

Listing creation applications 610 may allow sellers or service providers to conveniently author listings pertaining to goods or services that they wish to sell via the network-based publication system 500.

Feedback analysis applications 612 may allow the network-based publication system 500 to analyze feedback information received by the reputation applications 606 and make assessments with respect to performances of the trading parties. The feedback analysis applications 612 may provide attributes (e.g., rankings, percentages, comments, etc.) related to reputation dimensions (e.g., overall feedback rating, feedback ratings on cost of shipping, timeliness, communication, quality of advertisements, quality of listing descriptions, quality of packaging, quality of services provided, and the like).

Dispute resolution applications 614 may provide mechanisms whereby disputes arising between transacting parties may be resolved. For example, the dispute resolution applications 614 may provide guided procedures whereby the parties are guided through a number of steps in an attempt to settle a dispute. In the event that the dispute cannot be settled via the guided procedures, the dispute may be escalated to a third party mediator or arbitrator.

Search applications 616 may facilitate searching a database (e.g., database 524 of FIG. 5 or database 160 of FIG. 1) for a listing in the network-based publication system 500, based on a criterion received from client machine (e.g., client machine 140 of FIG. 1 or client machines 510 and 512 of FIG. 5).

Messaging applications 620 are responsible for the generation and delivery of messages to users of the network-based publication system 500. Such messages may, for example, advise users regarding the status of listings at the network-based publication system 500 (e.g., providing "outbid" notices to bidders during an auction process or providing promotional and merchandising information to users). In one example embodiment, the messaging applications 620 may notify a user when an entity (e.g., seller, buyer, service provider, or client) associated with a searched object has transgressed a predefined threshold related to an attribute of a reputation dimension other than the ones selected by the user as a search query (e.g., the user has selected the shipping cost as the search criteria but among the found objects, there are objects offered by sellers who have more than 35% late delivery of sold items. In this case, the messaging applications may notify the user of such instances if the predefined threshold is 20%).

Control applications 622 may facilitate receiving control signals from the control 175 of FIG. 1 and/or from input devices such as a keyboard, mouse, joystick, and the like. The control applications may also assist in interpreting the control signals and providing appropriate command signals to be sent by the server 110 of FIG. 2 to the client machine 140 of FIG. 2 to navigate the 3-D interface object based on user selections, as described above.

User interface applications 624 may operate to receive user selections of the form of the 3-D interface object such as cube, sphere, ellipsoid, or 3-D wall. The user interface applications may also be used by the display module 280 of FIG. 2 to display and navigate the 3-D interface object and to display controls 175 of FIG. 1 as described with respect to FIG. 2 above.

Example Machine Architecture

Figure 7:
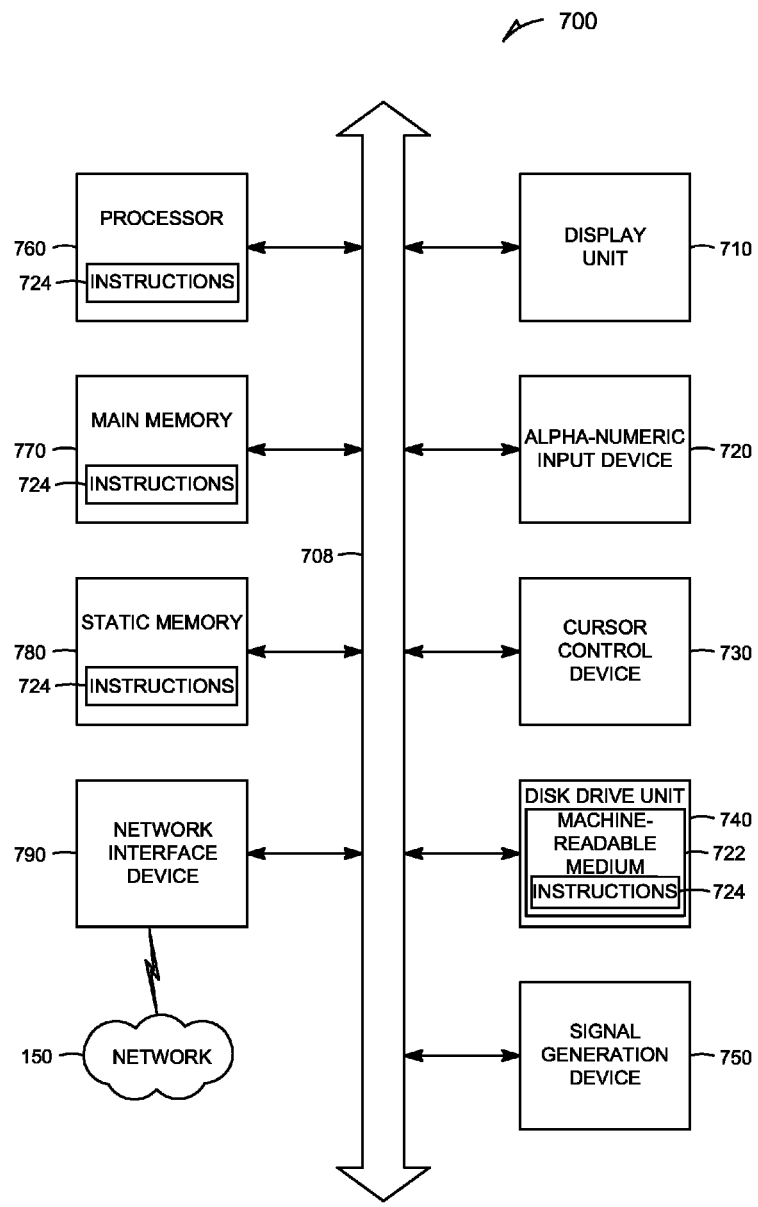
FIG. 7 is a block diagram illustrating a diagrammatic representation of a machine in the example form of a computer system, according to various embodiments.

FIG. 7 is a block diagram, illustrating a diagrammatic representation of a machine 700 in the example form of a computer system within which a set of instructions for causing the machine 700 to perform any one or more of the methodologies discussed herein may be executed. In alternative embodiments, the machine 700 may operate as a standalone device or may be connected (e.g., networked) to other machines. In a networked deployment, the machine 700 may operate in the capacity of a server or a client machine in a server-client network environment, or as a peer machine in a peer-to-peer (or distributed) network environment. The machine 700 may be a server computer, a client computer, a PC, a tablet PC, a set-top box (STB), a PDA, a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

In embodiments, the example computer system 700 may operate as the server 110 of FIG. 1 or as the client machine 140 of FIG. 1. The example computer system may include a processor 760 (e.g., a central processing unit (CPU), a graphics processing unit (GPU) or both), a main memory 770 and a static memory 780, all of which communicate with each other via a bus 708. The computer system 700 may further include a display unit 710 (e.g., liquid crystal displays (LCD) or cathode ray tube (CRT)). The computer system 700 also may include an alphanumeric input device 720 (e.g., a keyboard), a cursor control device 730 (e.g., a mouse), a disk drive unit 740, a signal generation device 750 (e.g., a speaker), and a network interface device 790.

The disk drive unit 740 may include a machine-readable medium 722 on which is stored one or more sets of instructions (e.g., software 724) embodying any one or more of the methodologies or functions described herein. The software 724 may also reside, completely or at least partially, within the main memory 770, static memory 780, and/or within the processor 760 during execution thereof by the computer system 700, the main memory 770 and the processor 760 also constituting machine-readable media.

The software 724 may further be transmitted or received over a network 150 via the network interface device 790. In embodiments, the network interface device may operate as the server communication module 250 and the client communication module 260, both of FIG. 2.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium"

shall accordingly be taken to include, but not be limited to, solid-state memories and optical and magnetic media.

Example Screen Shots

Figure 8:
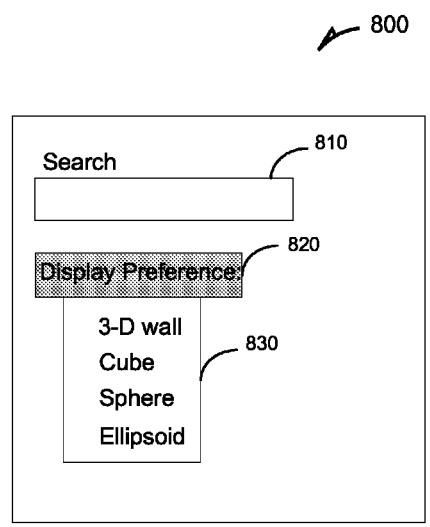
FIG. 8 is a diagram illustrating a screen shot of a search page, according to various embodiments.

FIG. 8 is a diagram illustrating a screen shot of a search page 800, according to various embodiments. The user 130 of FIG. 1 may see the search page 800 after the user 130 begins, for example, to search a listing in the publication system 115 of FIG. 1. The user may enter the one or more keywords in the search box 810 and hit enter to see the search results displayed in a default display form. The default display form may, for example, comprise a horizontal-line structure, where the search results (e.g., listings) are shown on consecutive horizontal lines. In embodiments, the user 130 may select a display form from a list 830 of display form options shown under a display preference button 820. For instance, the user 130 may select the cube option. In this case, the search results may be shown on various sides of a cube as shown in FIG. 9 and described below.

Figure 9:
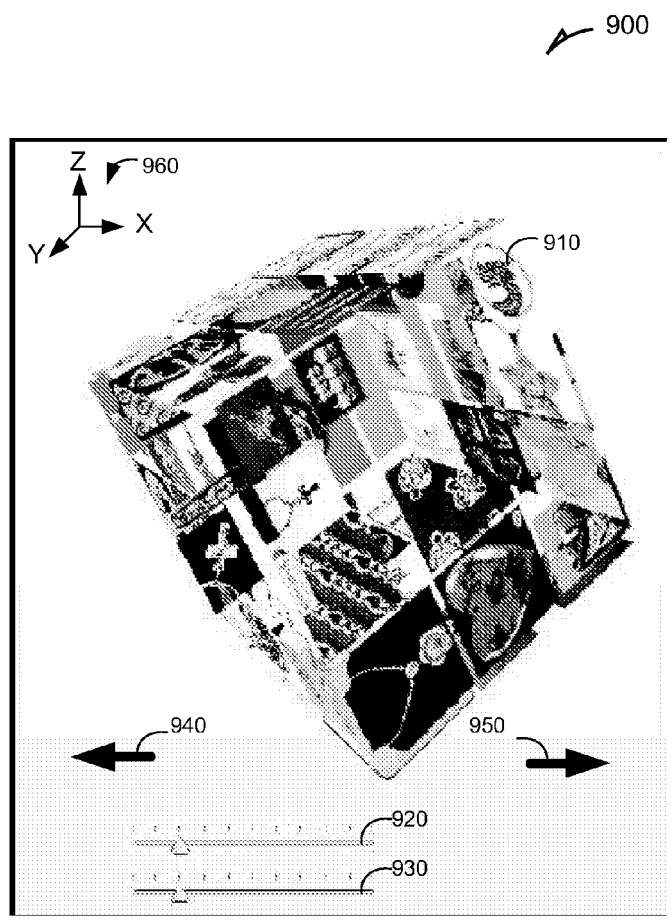
FIG. 9 is a screen shot illustrating a cube display of listing items, according to various embodiments.

FIG. 9 is a screen shot illustrating a cube display 900 of listing items, according to various embodiments. The search results shown in cube display 900 may comprise listed items retrieved from the database 160 of FIG. 1 of the publication system 115. The user 130 of FIG. 1 may use one of the controls 920 or 930 to navigate the cube 910. In embodiments, the user 130 may use the control 920 to control the rotational speed of cube 910 around one axis, such as Z axis of the coordinate system 960. The user may also use the control 930 to control the rotational speed of the cube 910 around another axis, for instance X or Y axis of the coordinate system 960 or some other axes. The cube display 900 may comprise other kinds of tools for the user to select the rotational axis and/or a corresponding rotational speed of the cube 910. The direction of rotation of the cube may be selected by the direction controls 950 and 940, for example, for rotations of the cube 910 around the Z axis of the coordinate system 960.

Figure 10:
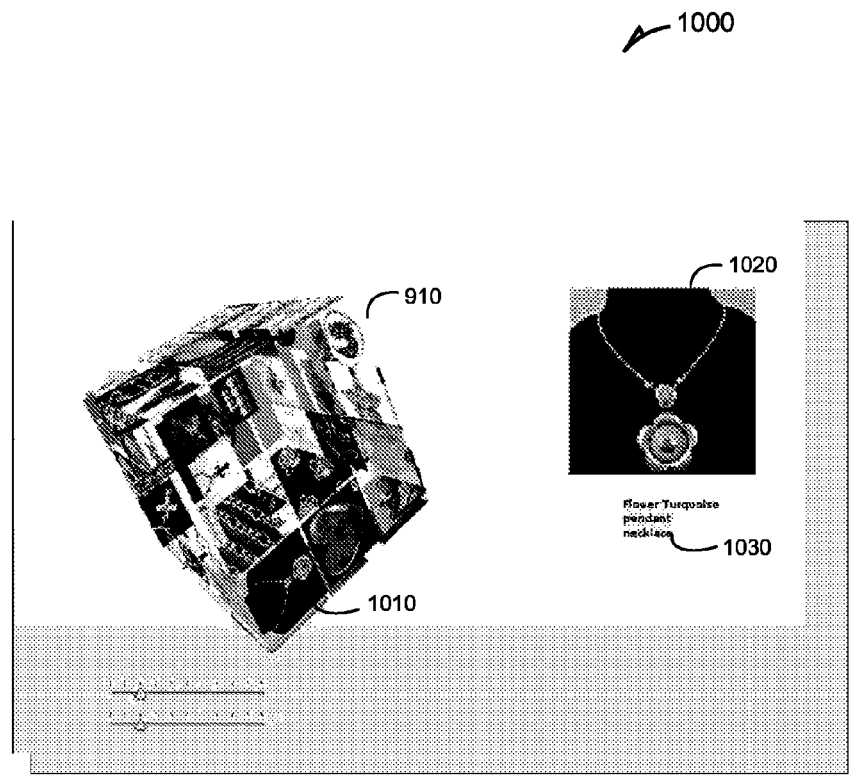
FIG. 10 is a screen shot illustrating a display of an item selection from the cube of FIG. 10, according to various embodiments.

FIG. 10 is a screen shot illustrating a display 1000 of an item selection from the cube 910 of FIG. 9, according to various embodiments. The user 130 of FIG. 1, while rotating the cube 910 and browsing various sides of the cube 910, may come across an item in which the user 130 may be interested. The user may select an item 1010 by hovering/clicking a mouse over the item 1010. An enlarged image 1020 of the item 1010 will then be shown proximate to the cube 910. A text object 1030 shown in the display 1000 may comprise a title and/or a detailed description of the item 1010. The detailed description may include a description of the item 1010, one or more prices, and one or more dates relating to the item 1010. The one or more prices may include a BUY IT NOW price and/or a current bid price. The dates may include an expiration date and/or an end of auction date.

FIG. 11 is a screen shot illustrating a 3-D wall display 1100 of listing items, according to various embodiments. The 3-D wall may, for example, comprise two sides 1112 and 1114 separated by the corner line 1110. The user 130 of FIG. 1 may navigate through the listings shown in the 3-D wall display 1100 by using the control buttons 1120 and 1125. A two-dimensional view 1140 of the 3-D wall display 1100 shown in FIG. 11 may comprise more information than just pictures. For example, for an item 1130 on the 3-D wall, a corresponding display-object on the two dimensional view 1140 may further include a title 1150 and a description 1160. The description 1160 may include detailed information relating to the item 1130 including one or more prices and one or more dates. The one or more prices may include a BUY IT NOW price and/or a current bid price. The dates may include an expiration date and/or an end of auction date.

FIG. 12 is a screen shot illustrating a slide show of listing items shown in the 3-D wall of FIG. 11, according to various embodiments. The items listed on the 3-D wall display 1100 may also be viewed on a slide show 1200. The slide show 1200 may display a picture 1210 and a description 1215 of an item shown in the 3-D wall 1100 of FIG. 11. The description 1215 may include detailed information relating to the item 1210, including one or more prices and one or more dates. The one or more prices may include a BUY IT NOW price and/or a current bid price. The dates may include an expiration date and/or an end of auction date. The slide show 1200 may be operated via a play button 1220, a pause button 1260, a home button 1230, a backward button 1240, and a forward button 1250. A frequency (e.g., a number of slides per second) of the slide show 1200 may be controlled by sliding a pointer 1270 across a slit 1280.

Figure 13:
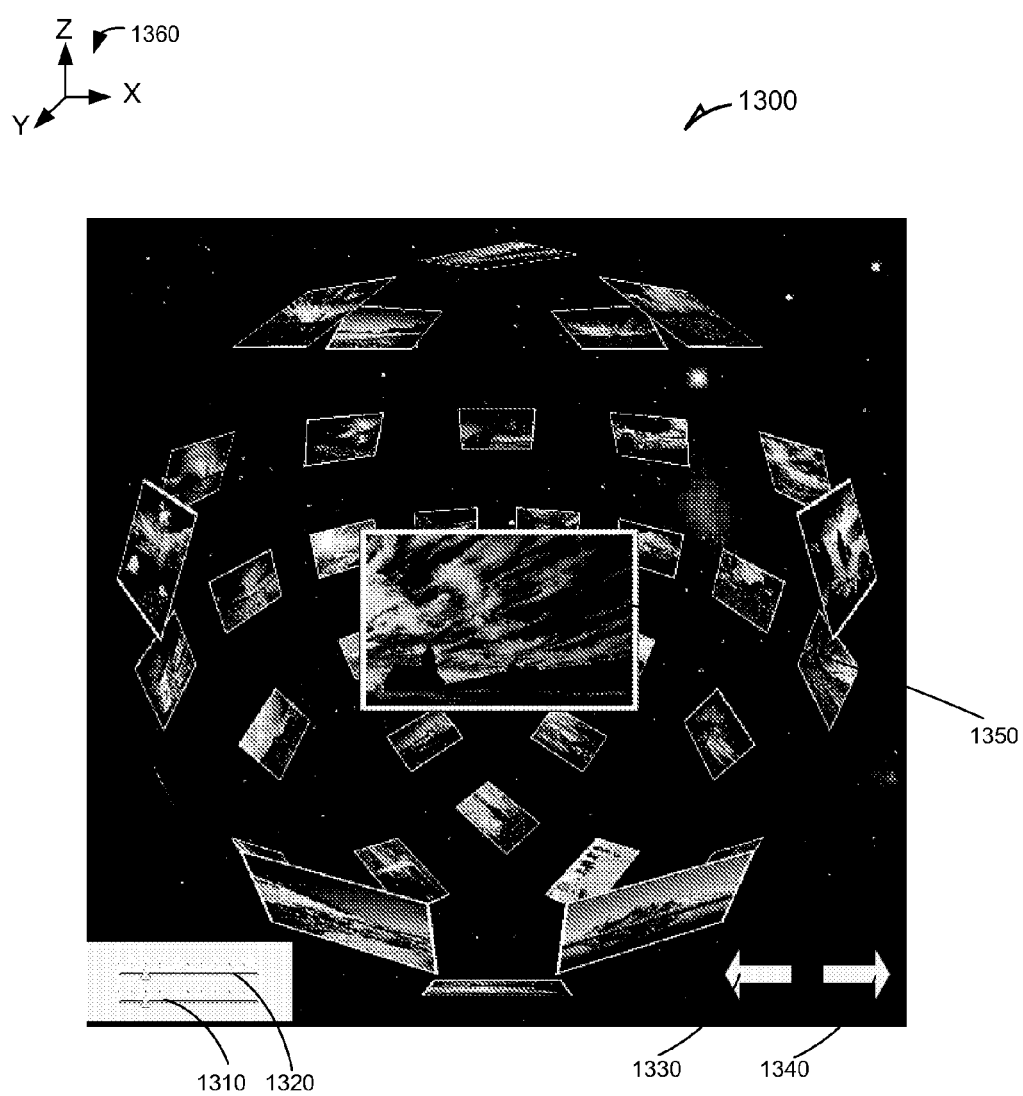
FIG. 13 is a screen shot illustrating a sphere display of listing items, according to various embodiments.

FIG. 13 is a screen shot illustrating a sphere display 1300 of listing items, according to various embodiments. In an embodiment, the user 130 of FIG. 1 when searching using the search page 800 of FIG. 8 may select from the list 830 of FIG. 8 the sphere option. The search results shown in sphere display 1300 may comprise listed items retrieved from the database 160 of FIG. 1 of the publication system 115. The user 130 may use one of the controls 1310 or 1320 to navigate the sphere shown in sphere display 1300. In embodiments, the user 130 may use the control 1310 to control the rotational speed of sphere around one axis, such as Z axis of the coordinate system 1360. The user may also use the control 1320 to control the rotational speed of the sphere around another axis, for instance X or Y axis of the coordinate system 1360 or some other axes. The sphere display 1300 may comprise other kinds of tools for the user to select the rotational axis and/or a corresponding rotational speed of the sphere. The direction of rotation of the sphere may be selected by the direction controls 1330 and 1340, for example, for rotations of the sphere around the Z axis of the coordinate system 1360.

Thus, a computerized method and system for 3-D displaying and navigating of search results have been described. Although the present disclosure has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
receiving, at a publication system, a query defined by a user of the publication system from a client machine;

searching a database that contains a plurality of listings associated with the publication system based on the query;

retrieving a search result from the database based on the query, the search result referencing a listing among the plurality of listings, the listing including a thumbnail image and a detailed description; and generating an interface configured to:
- display the thumbnail image of the listing as a reference to the search result a side of a three-dimensional (3-D) interface object of the interface;
- display the detailed description of the listing in response to a user selection of the thumbnail image; and
- display at least one control usable to navigate the 3-D interface object.

2. The method of claim 1, wherein the query includes one or more words contained in the plurality of listings.

3. The method of claim 1, wherein the publication system comprises a commerce system including an online auction site.

4. The method of claim 1, wherein the 3-D interface object comprises a 3-D display in a form including at least one of a cube, a sphere, an ellipsoid, or a 3-D wall.

5. The method of claim 4, wherein the 3-D wall comprises a slide show.

6. The method of claim 5, further comprising receiving signals from the at least one control, the signals to indicate a selection by a user of an operation including at least one of playing, pausing, forwarding, or rewinding of the slide show.

7. The method of claim 6, further comprising causing at least one of playing, pausing, forwarding, or rewinding of the slide show based on the selection.

8. The method of claim 6, further comprising causing at least one of playing, pausing, forwarding, or rewinding of the slide show based on signals from an input device including at least one of a keyboard, a joystick, or a mouse.

9. The method of claim 1, further receiving signals from the at least one control, the signals to indicate a selection by a user to rotate the 3-D interface object.

10. The method of claim 1, further comprising receiving signals from the at least one control, the signals to indicate a selection by a user of a rotation axis.

11. The method of claim 10, further comprising causing a rotation of the 3-D interface object based on the selection.

12. The method of claim 1, further comprising receiving signals from the at least one control, the signals to indicate a selection by a user of a direction of rotation of the 3-D interface object.

13. The method of claim 12, further comprising causing a rotation of the 3-D interface object in the direction of rotation selected by the user.

14. The method of claim 1, further comprising causing a rotation of the 3-D interface object around an axis based on signals from an input device.

15. The method of claim 1, further comprising causing a rotation of the 3-D interface object in a direction based on signals from an input device.

16. The method of claim 1, further comparing displaying the at least one control proximate to and/or over the 3-D interface object.

17. A publication system comprising:
a server communication module to receive a query defined by a user of the publication system from a client machine;
a search module to search a database that contains a plurality of listings associated with the publication system based on the query,
the search module to retrieve a search result from the database based on the query, the search result referencing a listing among the plurality of listings, the listing including a thumbnail image and a detailed description; and
a processor to cause generating of a display of the thumbnail image of the listing as a reference to the search result on a side of a three-dimensional (3-D) interface object,
the processor to cause generating of a display of the detailed description of the listing in response to a user selection of the thumbnail image,
the processor to cause generating of a display of at least one control usable to navigate the 3-D interface object.

18. The system of claim 17, wherein the query includes one or more words contained in the plurality of listings.

19. The system of claim 17, wherein the processor is to cause generating of a display of the 3-D interface object in the form of at least one of a cube, a sphere, an ellipsoid, or a 3-D wall.

20. The system of claim 19, wherein the processor is to cause generating of the display of the 3-D wall comprising a slide show.

21. The system of claim 20, further comprising a server control module to receive signals from the at least one control, the signals indicating a selection by a user of an operation including at least one of playing, pausing, forwarding, or rewinding of the slide show.

22. The system of claim 21, wherein the server control module is to receive signals from the at least one control, the signals indicating a selection by a user to rotate the 3-D interface object.

23. The system of claim 21, wherein the server control module is to receive signals from the at least one control, the signals indicating a selection by a user of a rotation axis.

24. The system of claim 21, wherein the control module is to receive signals from the at least one control, the signals indicating a selection by a user of a direction of rotation of the 3-D interface object.

25. A non-transitory machine-readable medium comprising instructions, which when executed by one or more processors, perform a method comprising:
receiving, at a publication system, a query defined by a user of the publication system from a client machine;
searching a database that contains a plurality of listings associated with the publication system based on the query;
retrieving a search result from the database based on the query, the search result referencing a listing among the plurality of listings, the listing including a thumbnail image and a detailed description; and
generating an interface configured to:
- display the thumbnail image of the listing as a reference to the search result on a side of a three-dimensional (3-D) interface object of the interface;
- display the detailed description of the listing in response to a user selection of the thumbnail image; and
- display at least one control usable to navigate the 3-D interface object.

26. A method comprising:
transmitting, from a client machine, a query received from a user to a server associated with a publication system;
receiving, from the server, a search result retrieved from a database that contains a plurality of listings based on the query, and one or more command signals relating to the search result, the search result referencing a listing among the plurality of listings, the listing including a thumbnail image and a detailed description; and
generating an interface configured to:

display the thumbnail image of the listing as a reference to the search result on a side of a three-dimensional (3-D) interface object of the interface based on the one or more command signals;

display the detailed description of the listing in response to a user selection of the thumbnail image; and display at least one control usable to navigate the 3-D interface object.

27. The method of claim 26, further including generating a display of a rotation of the 3-D interface object around at least one axis of rotation and in a direction, based on a user selection.

28. The method of claim 27, wherein the user selection is received from at least one of the server or the at least one control.

29. A client machine comprising:

a client communication module to transmit, from the client machine, a query received from a user to a server associated with a publication system;

the client communication module to receive, from the server, a search result retrieved from a database containing a plurality of listings based on the query, and one or more command signals relating to the search result, the search result referencing a listing among a plurality of listings, the listing including a thumbnail image and a detailed description; and a display module to generate a display of the thumbnail image of the listing as a reference to the search result on a side of a three-dimensional (3-D) interface object based on the one or more command signals, the display module to generate a display of the detailed description in response to a user selection of the thumbnail image, the display module to generate a display of at least one control usable to navigate the 3-D interface object.

30. The client machine of claim 29, wherein the display module is to display a user selection of the 3-D interface object.

31. The client machine of claim 30, further comprising a client control module to control a movement of the user selected 3-D interface object.

32. The client machine of claim 31, wherein the client control module is to control a rotation of the 3-D interface object around at least one axis of rotation and in a direction, based on a user selection.

33. The client machine of claim 31, wherein the client control module is to control a direction of rotation and a rotation speed of the 3-D interface object based on a user selection.

34. The method of claim 1, wherein the generating of the interface configures the interface to display the detailed description of the listing on a page that displays the 3-D interface object of the interface.

35. The method of claim 1, wherein the generating of the interface configures the interface to display the detailed description of the listing on a separate page than a page displaying the 3-D interface object.

* * * * *

UNITED STATES PATENT AND TRADEMARK OFFICE
CERTIFICATE OF CORRECTION

PATENT NO.         : 8,443,300 B2
APPLICATION NO.    : 12/862630
DATED              : May 14, 2013
INVENTOR(S)        : Satish Kumar Nankani Page 1 of 1

It is certified that error appears in the above-identified patent and that said Letters Patent is hereby corrected as shown below:

On the title page, in column 2, under Item "(57) Abstract", line 8, after "the", delete "three", therefor In the Claims In column 11, line 10, in claim 1, after "result", insert --on--, therefor In column 11, line 58, in claim 16, delete "comparing" and insert --comprising--, therefor Signed and Sealed this
Eighteenth Day of November, 2014

Michelle K. Lee
*Deputy Director of the United States Patent and Trademark Office*